(12) United States Patent
French

(10) Patent No.: US 10,158,215 B1
(45) Date of Patent: Dec. 18, 2018

(54) SYSTEM FOR PROTECTING WALL VOIDS AGAINST CONSTRUCTION DEBRIS

(71) Applicant: Dean W. French, Renner, SD (US)

(72) Inventor: Dean W. French, Renner, SD (US)

( * ) Notice: Subject to any disclaimer, the term of this patent is extended or adjusted under 35 U.S.C. 154(b) by 0 days.

(21) Appl. No.: 15/814,506

(22) Filed: Nov. 16, 2017

(51) Int. Cl.
*H02G 3/08* (2006.01)
*H02G 3/12* (2006.01)
*B29L 31/34* (2006.01)

(52) U.S. Cl.
CPC ............. *H02G 3/088* (2013.01); *H02G 3/12* (2013.01); *B29L 2031/3481* (2013.01)

(58) Field of Classification Search
CPC ................................ H02G 3/088; H02G 3/12
USPC ...................................... 174/50, 66
See application file for complete search history.

(56) References Cited

U.S. PATENT DOCUMENTS

| | | |
|---|---|---|
| D342,235 S | 12/1993 | Shotey |
| 5,723,816 A | 3/1998 | Neece |
| 5,837,937 A | 11/1998 | Reese |
| 5,902,960 A | 5/1999 | Smith |
| 6,538,202 B1 | 3/2003 | Shaffer |
| 6,653,566 B2 | 11/2003 | Petak |
| 6,668,471 B1 | 12/2003 | Cook |
| D502,927 S | 3/2005 | Zimmerman |
| 6,867,370 B2 | 3/2005 | Compagnome, Jr. |
| 6,906,620 B2 | 6/2005 | Nakai |
| 7,094,968 B2 * | 8/2006 | Motzigkeit ............ H02G 3/088 16/2.2 |

* cited by examiner

*Primary Examiner* — Dhiru R Patel

(74) *Attorney, Agent, or Firm* — Jeffrey A. Proehl; Woods, Fuller, Shultz & Smith, PC

(57) ABSTRACT

A void insert device for positioning in a wall void having void surfaces may have a perimeter with a perimeter surface configured to be positioned in contact with the void surface of the wall void, and the perimeter has a perimeter shape and a perimeter size. A portion of the insert device adjacent to the perimeter surface of the insert device may be formed of a compressible material permitting compression of the insert device to inset the insert device into the wall void, and the compressible material of the insert device may be characterized by having a degree of resiliency. The perimeter shape, size, and degree of resiliency of the compressible material may be configured to press the perimeter surface against the void surface of the wall void to resist movement of the insert device further into the void.

18 Claims, 2 Drawing Sheets

SYSTEM FOR PROTECTING WALL VOIDS AGAINST CONSTRUCTION DEBRIS

BACKGROUND

Field

The present disclosure relates to shields used in construction, and more particularly pertains to a new system for protecting wall voids against construction debris.

SUMMARY

In one aspect, the present disclosure relates to a void insert device for positioning in a wall void located in a wall surface of a wall. The wall void may have a void opening in the wall surface and void surfaces extending from the void opening in a substantially perpendicular orientation to the wall surface to extend about an interior of the void. The device may have a perimeter with a perimeter surface configured to be positioned in contact with the void surface of the wall void, with the perimeter having a perimeter shape and a perimeter size. At least a portion of the void insert device adjacent to the perimeter surface of the insert device may be formed of a compressible material permitting compression of the insert device to inset the insert device into the wall void. The compressible material of the insert device may be characterized by having a degree of resiliency. The perimeter shape, the perimeter size, and the degree of resiliency of the compressible material of the insert device may be configured to press the perimeter surface of the insert device against the void surface of the wall void to resist movement of the insert device further into the void.

In another aspect, the disclosure relates to a system which may include a wall having a wall surface, and a wall void formed in the wall, with the wall void having a void interior and a void opening in the wall surface. The void opening has a void opening shape and a void opening size, with the void opening having a perimeter edge in the plane of the wall surface. The wall void may have void surfaces extending from the void perimeter edge in an orientation substantially perpendicular to the plane of the wall surface to define at least a portion of the void. The system further includes a void insert device removably positioned in the wall void, with the insert device having a perimeter with a perimeter surface positioned in contact with the void surface of the wall void and the perimeter having a perimeter shape and a perimeter size. At least a portion of the void insert device adjacent to the perimeter surface of the insert device is formed of a compressible material permitting compression of the insert device to inset the insert device into the wall void. The compressible material of the insert device may be characterized by having a degree of resiliency. The perimeter shape, the perimeter size, and the degree of resiliency of the compressible material of the insert device may be configured to press the perimeter surface of the insert device against the void surface of the wall void to resist movement of the insert device further into the void.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components, and the particulars of the steps, set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
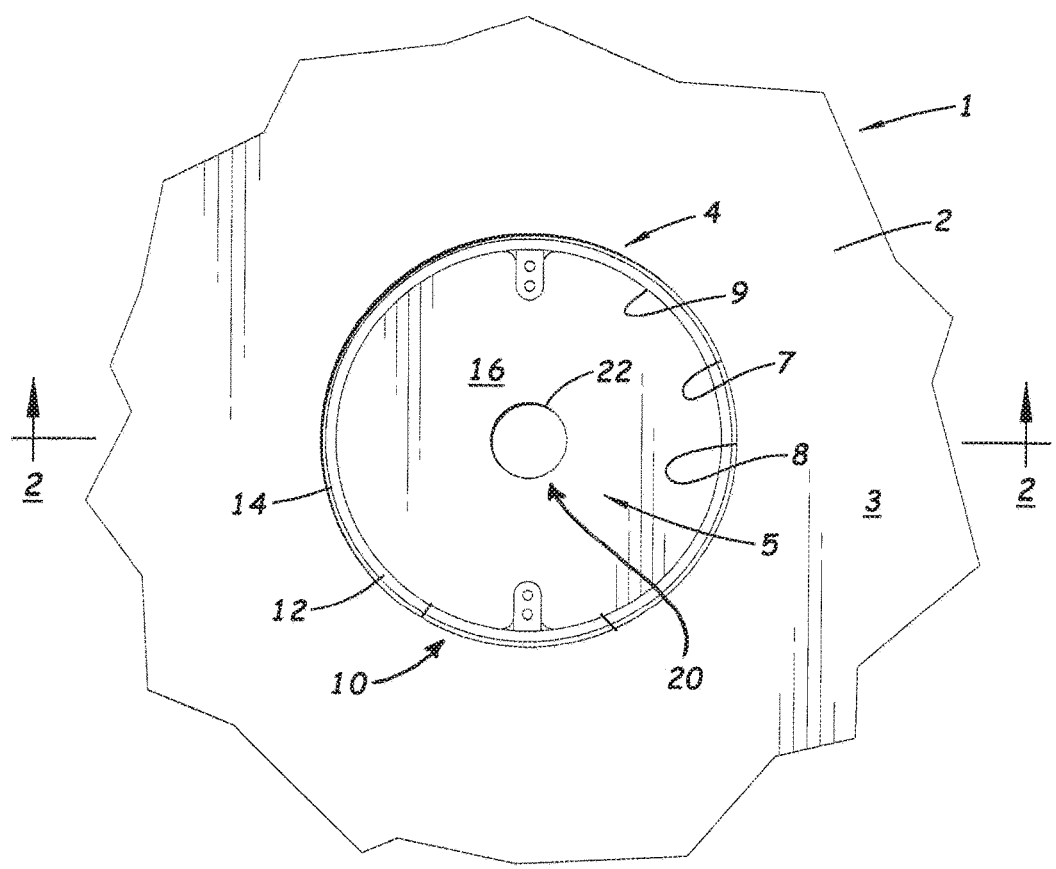
FIG. 1 is a schematic front view of a new system for protecting wall voids against construction debris according to the present disclosure.
Figure 2:
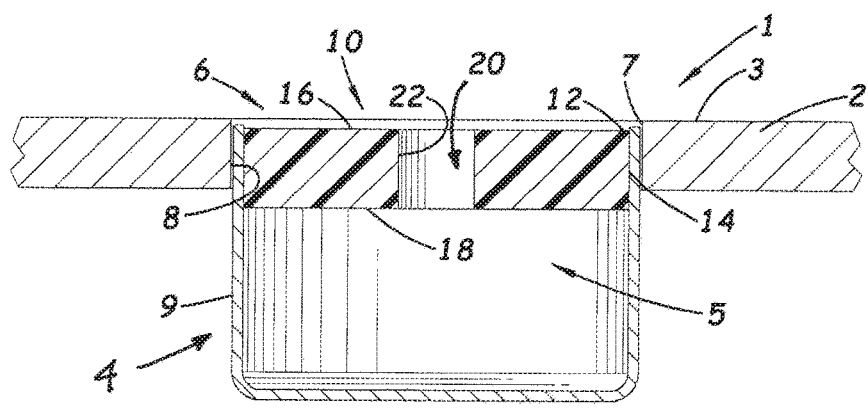
FIG. 2 is a schematic sectional view of the system taken along line 2-2 of FIG. 1, according to an illustrative embodiment.
Figure 3:
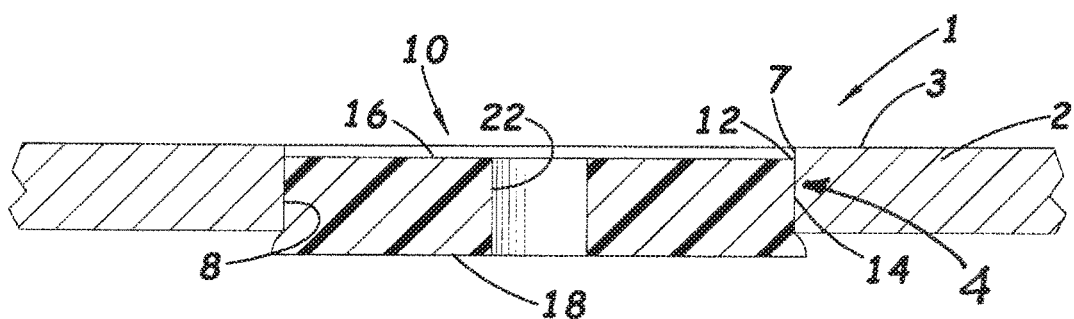
FIG. 3 is a schematic sectional view of the another embodiment of the system for protecting wall voids against construction debris, according to an illustrative embodiment.
Figure 4:
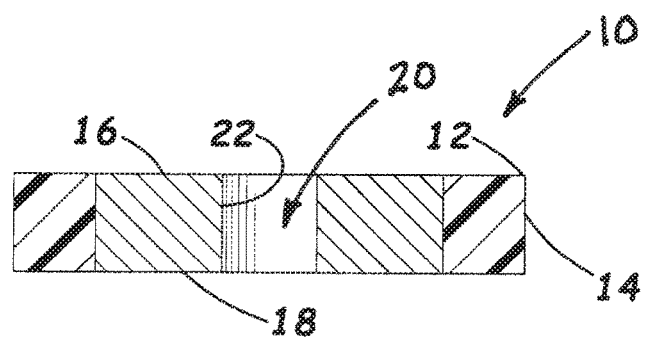
FIG. 4 is a schematic sectional view of an embodiment of the void insert device, according to an illustrative embodiment.

With reference now to the drawings, and in particular to FIGS. 1 through 4 thereof, a new system for protecting wall voids against construction debris embodying the principles and concepts of the disclosed subject matter will be described.

Construction and finishing of walls, floors, and ceilings of building structures typically include the application of many materials. For example, after wall board is installed, finishing of the wall may include the application of joint compound to joints in the wall board, and the subsequent application of texture and/or paint. In order to economize the finishing of the wall, some of these materials, such as the joint compound, are applied in a fairly quick manner. Other materials, such as texture and paint, may be spray applied to the wall under pressure to also facilitate quick finishing of the wall. Further, once the wall board has been installed, insulation materials may be blown into spaces above and behind the wall board using air pressure to distribute the material.

These materials, and the techniques used to apply or otherwise these materials, can also lead to these materials moving through voids formed in the wall board for accommodating various structures, such as utility items including electrical devices, ventilation ducts, light housings or "cans", as well as a variety of other structures that need to penetrate through the wall surface from the space behind the wall board and leave behind debris. Typically, much of the finishing of the wall is conducted prior to the final installation of electrical devices, vent covers, and lighting bulbs and trim in order to protect these elements from overspray, etc. However, the voids themselves are vulnerable to being filled with construction debris such as over-sprayed paint, over-applied joint compound, and the voids can even form a conduit for insulation materials to migrate from the space behind the wall board, through the void, and enter the room space, wasting the material and creating a mess of construction debris in the living space.

While various attempts have been made to cover these voids, the applicant has recognized that the various approaches have suffered from a number of drawbacks. One such drawback of known cover devices is that the cover also covers portions of the wall surface adjacent to the void so that texturing and painting of the wall surface is not complete. Another drawback of know approaches is that the devices are often not sufficiently sturdy to resist the air pressure of a paint or texture sprayer, or the force applied by a trowel spreading joint compound, or the pressure applied to the rear of the wall surface during installation of insulation in the space behind the wall board, any of which can lead to dislodgement of the device and loss of any protection previously provided.

The applicant has devised an insert device for temporarily closing these wall voids during the wall finishing process as well as during the insulation installation process. The insert device is also easily reusable to block wall voids on a subsequent job due to the relative simplicity and durability of the insert device as well as the ability to relatively easily clear paint, joint compound, texture, etc. off of the insert device after it has been removed from the wall void and prior to a subsequent reuse of the device.

Significantly, the frictional engagement of the perimeter surface of the insert device with the inner surfaces of the void holds the insert in position against force or pressure typically encountered by the insert device from, for example, the spraying of texture materials or paint directly against the front of the insert device or the blowing of insulation into a wall or ceiling cavity behind the void.

In some aspects, the disclosure relates to a system 1 which may include a wall 2 of a room or other enclosure. The wall 2 may have a wall surface 3 which is typically, although not necessarily, a substantially planar surface, and may be formed of a substantially rigid wall board. For the purposes of this description, the term "wall" is intended to mean not only a wall having a vertically oriented surface 3 for typically separating rooms, but also a ceiling or a floor which has a substantially horizontally oriented surface 3 for typically separating levels of a building.

One or more wall voids 4 may be formed in the wall 2 of the system 10. Each wall void 4 may have a void interior 5 which extends into the wall through a void opening 6 in the wall surface. The void opening 6 may have a perimeter edge 7 in the plane of the wall surface 3. The void opening 6 may have a void opening shape defined by the perimeter edge 7 which may be, for example, circular or substantially circular in shape, but may also has a polygonal shape such as square or rectangular or hexagonal or octagonal. The void opening shape may also be irregular in shape. The void opening 6 may also have a void opening size which may be measured in terms of, for example, width, length, and/or diameter.

The wall void 4 may also have a depth extending into the wall 2 which is measured from the plane of the wall surface 3 in a direction oriented substantially perpendicular to the wall surface. The wall void 4 may have void surfaces 8 which define at least a portion of the void. The void surfaces 8 may extend substantially perpendicular to the plane of the wall surface 3 rom at least portions of the void perimeter edge 7, if not the entirety of the edge 7.

In some embodiments, the wall void 4 may be formed by a structure 9 that defines a recess in the wall. For example, the structure 9 may comprise an electrical box (for mounting, as an example, a switch or a receptacle), or a light housing or "can", or a vent duct, or other structure that defines a recess in communication with the wall surface. In some embodiments, the structure 9 may comprise edge surfaces of the wall board of the wall which form the void opening 6. For example, an opening cut into drywall or gypsum board exposes edges of the board that have a depth at least equal to the thickness of the board (see, e.g., FIG. 3).

The system 1 may also include a void insert device 10 either alone or in combination with the wall and wall void 4. The void insert device 10 is positioned, or may be positionable, in one of the wall voids 4 of the wall 2 (see, e.g., FIGS. 1 and 2). The void insert device 10 may have a perimeter 12 which may have a perimeter surface 14 which is positioned or positionable against the void surfaces 8 of the particular wall void. The perimeter surface 14 may extend along the perimeter 12, although the perimeter surfaces may be limited to portions or sections of the perimeter 12 without being the complete perimeter 12. Perimeter surfaces that extend along substantially the entire perimeter 12 may be preferred for providing the most complete coverage against "leakage" of debris past the device.

The void insert device 10 may be positioned adjacent to the void opening 6 at the portion of the void or structure 9 which forms the front of the void. The perimeter 12 may have a perimeter shape that generally corresponds to the void opening shape of the wall void. The perimeter 12 may also have a perimeter size which generally corresponds to the void opening size of the wall void, The perimeter size may be slightly larger than the void opening size of the void opening to produce a friction or an interference fit between the void insert device 10 and the void surfaces 8 of the wall void. The shape and size configuration of the particular insert device may be thus be selected based upon the shape and size of the wall void to produce the snug relationship between the perimeter surface of the insert device and the void surfaces of the wall void.

The void insert device 10 may have a front surface 16 and a rear surface 18, and the front surface may be positionable in the plane of the wall surface. In some embodiments, the front 16 and rear 18 surfaces of the insert device 10 are substantially planar in shape, and may be oriented substantially parallel to each other. The thickness of the void insert device may be defined between the front 16 and rear 18 surfaces. The perimeter surface 14 may have a perimeter width which may be measured in a direction substantially perpendicular to the front surface 16, and may generally correspond to the thickness of the void insert device. The width of the perimeter surface should be width enough to generate sufficient friction or pressure between the perimeter surface and the void surface to permit the insert device to maintain its position in the void when pressure or force is applied by paint sprayers, drywall compound trowels, or other pressures applied to the insert device.

A manipulation structure 20 may be located on the void insert device 10 to facilitate manipulation of the void insert device, such as removal of the void insert device from the wall void and in some case insertion of the device 10 into the wall void. Illustratively, the manipulation structure 20 may comprise a finger manipulation hole 22 formed in the void insert device. The manipulation hole 22 may extend between the front 16 and rear 18 surfaces of the void such that the hole 22 extends through the device 10. In other embodiments, the manipulation hole 22 may extend through the front surface 16 for only a portion of the thickness of the device such that a blind hole is formed. Illustratively, only a single hole may be formed in the void insert device to limit air and debris movement through the device, or into and out of the void interior. Other suitable manipulation structures 20 may be utilized, such as knobs, handles, loops, etc.

The void insert device 10 may be at least partially formed of a resiliently compressible material that permits compression of at least a portion of the insert device when the insert device is being inserted into the wall void and the perimeter surface 14 of the insert device are contacting or brought into contact with the void surfaces 8 of the wall void. Suitable resiliently compressible materials will exhibit resiliency or recovery of size and shape that cause the perimeter surface of the void insert device to press against the void surfaces of the wall void to a degree that at least resists movement of the insert device 10 once the device 10 has been inserted into the wall void and the perimeter surface 14 engages (or at least substantially engages) the void surfaces 8. An illustrative resiliently compressible material comprises a foamed material, which may have a plurality of air containing bubbles or cells within the material which are surrounded by flexible cell walls. The resilient compressibility of the insert device allows the device to be easily mounted on the void surfaces while resisting movement of the insert device with respect to the wall void once inserted and pressures are applied to the either the front surface 16 or rear surface 18 of the insert device. In some embodiments, perimeter portions of the insert device may be comprised of resiliently compressible material while more central portions are formed of materials that are not resiliently compressible, such as a rigid material (see FIG. 4).

The compressibility of the material forming the insert device may also facilitate the removal of foreign materials from the device. For example, compression of the material of the device may facilitate the removal of rigid debris from the surface of the device (such as dried paint, dried joint compound and dried texture material) after it has been removed from the wall void and prior to reuse of the device 10 in another wall void. The compression may be effected by hand squeezing or bending of the material of the insert.

In some embodiments, the resiliently compressible foamed material comprises ethylene vinyl acetate (EVA) or other suitable foam rubber compound, although other materials may be employed. It is been observed that thicknesses of approximately 0.5 inches and greater provide a suitable level of resilient compressibility with sufficient rigidity to press the perimeter surface 14 of the insert device against the void surfaces of the wall void with sufficient force to maintain the insert device in place while still being able to be dislodged using force generated by the human arm. Some highly suitable embodiments have thicknesses between approximately 0.75 inches and approximately 1 inch. At these thicknesses, the perimeter size of the void insert device typically only needs to be approximately 0.1 inch to 0.2 inch greater than the size defined by the perimeter edge 7 of the void opening in order to provide sufficient expansive force against the void surfaces 8 of the wall void to maintain the insert device 10 in place. Typically, wall voids 4 with greater area will require insert devices with greater thickness and/or a greater degree of "overlap" in the size of the perimeter as compared to the size of the area defined by the void opening 6.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A void insert device for positioning in a wall void located in a wall surface of a wall, the wall void having a void opening in the wall surface and void surfaces extending from the void opening in a substantially perpendicular orientation to the wall surface to extend about an interior of the void opening;
   the void insert device having a front surface and a rear surface, the front surface being positionable in the plane of the wall surface, a thickness of the void insert device being defined between the front and rear surfaces,
   the void insert device having a perimeter with a perimeter surface to be positioned in contact with the void surface of the wall void, the perimeter surface having a perimeter width measured in a direction substantially perpendicular to the front surface and which corresponds to the thickness of the void insert device,
   at least a portion of the void insert device adjacent to the perimeter surface of the insert device being formed of a compressible material permitting compression of the insert device to inset the insert device into the wall void, the compressible material of the insert device being characterized by having a degree of resiliency,
   wherein the perimeter width of the perimeter surface is thick enough to generate sufficient friction or pressure between the perimeter surface and the void surface to permit the void insert device to maintain the position of the void insert device in the wall void when pressure or force is applied to the front surface of the void insert device by paint sprayers or drywall compound trowels, and wherein the perimeter surface extends along an entirety of the perimeter of the insert device, and the perimeter width of the perimeter surface is uniform from the front surface to the rear surface to permit full insertion of the void insert device into the wall void opening.

2. The device of claim 1 wherein the resiliently compressible material comprises a foamed material.

3. The device of claim 2 wherein the foamed material has a plurality of air-containing cells surrounded by flexible cell walls.

4. The device of claim 1 wherein the rear surface and the front surface of the insert device are oriented substantially parallel to each other.

5. The device of claim 1 wherein the void insert device has a manipulation structure to facilitate manipulation of the void insert for removal of the void insert device from the wall void.

6. The device of claim 5 wherein the manipulation structure comprises a finger manipulation hole in the insert device, the manipulation hole being open to receive a finger of a user of the device.

7. The device of claim 6 wherein the manipulation hole extends through the void insert device between front and rear surfaces of the insert device to permit the finger of the user to be inserted into the hole from the front surface to reach the rear surface with the tip of the finger.

8. The device of claim 7 wherein the manipulation hole comprises a single hole formed in the void insert device.

9. The device of claim 7 wherein the manipulation hole is substantially centered on the front surface of the void insert device.

10. The device of claim 1 wherein the compressible material extends to the front surface of the device and extends to the rear surface of the device.

11. A system comprising:
a wall having a wall surface;
a wall void formed in the wall, the wall void having a void interior and a void opening in the wall surface, the void opening having a void opening shape and a void opening size, the void opening having a perimeter edge in the plane of the wall surface, the wall void having void surfaces extending from the void perimeter edge in an orientation substantially perpendicular to the plane of the wall surface to define at least a portion of the void opening; and
a void insert device positioned in the wall void, the void insert device having a front surface and a rear surface, the front surface being positionable in the plane of the wall surface, a thickness of the void insert device being defined between the front and rear surfaces, the void insert device having a perimeter with a perimeter surface positioned in contact with the void surface of the wall void, the perimeter surface having a perimeter width measured in a direction substantially perpendicular to the front surface and which corresponds to the thickness of the void insert device, at least a portion of the void insert device adjacent to the perimeter surface of the insert device being formed of a compressible material permitting compression of the insert device to inset the insert device into the wall void, the compressible material of the insert device being characterized by having a degree of resiliency, wherein the perimeter width of the perimeter surface of the void insert device is thick enough to generate sufficient friction or pressure between the perimeter surface and the void surface to permit the void insert device to maintain the position of the void insert device in the wall void when pressure or force is applied to the front surface of the void insert device by paint sprayers or drywall compound trowels, and wherein the perimeter surface extends along an entirety of the perimeter of the insert device, and the perimeter width of the perimeter surface is uniform from the front surface to the rear surface to permit full insertion of the void insert device into the wall void opening.

12. The system of claim 11 wherein the perimeter shape of the insert device generally corresponds to the void opening shape of the wall void and the perimeter size of the insert device generally corresponds to the void opening size of the wall void.

13. The system of claim 11 wherein the perimeter size of the insert device is slightly larger than the void opening size of the void opening to produce an interference fit between the void insert device and the void surfaces of the wall void.

14. The system of claim 11 wherein the perimeter size of the insert device is slightly larger than the void opening size of the void opening to produce an interference fit between the void insert device and the void surfaces of the wall void.

15. The system of claim 11 wherein the wall void is formed by a structure that forms a recess in the wall.

16. The system of claim 15 wherein the structure comprises an electrical box.

17. The system of claim 11 wherein the void insert device has a manipulation structure to facilitate manipulation of the void insert for removal of the void insert device from the wall void.

18. The system of claim 11 wherein the resiliently compressible material of the insert device comprises a foamed material.

* * * * *